UNITED STATES PATENT OFFICE.

PAUL EHRLICH AND PAUL KARRER, OF FRANKFORT-ON-THE-MAIN, GERMANY, ASSIGNORS TO FARBWERKE VORM. MEISTER LUCIUS & BRUNING, OF HÖCHST-ON-THE-MAIN, GERMANY, A CORPORATION OF GERMANY.

ALKALI METAL SALTS OF 3.3¹-DIAMINO-4.4¹-DIOXYARSENOBENZENE COMBINED WITH COPPER AND PROCESS OF MAKING SAME.

1,117,352.

Specification of Letters Patent. Patented Nov. 17, 1914.

No Drawing. Application filed January 24, 1914. Serial No. 814,216.

*To all whom it may concern:*

Be it known that we, PAUL EHRLICH, M. D., professor of medicine, and PAUL KARRER, Ph. D., chemist, citizens of the Empire of Germany and Republic of Switzerland, respectively, residing at Frankfort-on-the-Main, Germany, have invented certain new and useful Improvements in Alkali Metal Salts of 3.3¹-Diamino-4.4¹-Dioxyarsenobenzene Combined with Copper and Process of Making Same, of which the following is a specification.

We have found that new compounds of the 3.3¹-diamino-4.4¹-dioxyarsenobenzene can be obtained by treating with an alkali the compounds produced by th ombination of diaminodioxyarsenobenzene vith a copper salt.

The procedure for preparing the new compound may, for instance, be as follows: The compound obtained from diaminodioxyarsenobenzene hydrochlorid and copper chlorid may be dissolved by means of caustic alkali and the new product precipitated from this solution by means of alcohol.

The new product constitutes an alkali salt of the dioxydiaminoarsenobenzene combined with copper and forms a dark powder; it dissolves in water with alkaline reaction and is insoluble in alcohol and ether, it changes in the air and thereby becomes insoluble in water. The product is of great therapeutical value in the treatment of infectious diseases, particularly sleeping-sickness.

The following examples illustrate our invention.

Example I: 40 grams of the compound from diaminodioxyarsenobenzene hydrochlorid and cupric chlorid, the preparation of which is described in U. S. Patent No. 1,091,881, dated March 31, 1914, are dissolved with 240 c. c. of 2 N. caustic soda-lye and the solution thus obtained is run, while stirring, into 4 liters of alcohol. The new compound separates and is filtered, washed with alcohol and ether and dried *in vacuo*. In order to prevent any decomposition, the said operations should be carried out in a nitrogen atmosphere. The new compound may, of course, also be prepared without isolating the combination of diaminodioxyarsenobenzene and cupric chlorid, namely by adding an alkali to its solution obtained by combining the components, the procedure being as follows:

Example II: 5 grams of 3.3¹-diamino-4.4¹-dioxyarsenobenzene are dissolved in 40 c. c. of water, a solution of 1.8 grams of crystallized cupric chlorid dissolved in 15 c. c. of water is added and then are introduced, while well stirring and cooling with ice, 8 c. c. of 10 N. caustic soda-lye. After the whole is completely dissolved, it is filtered in 900 c. c. of alcohol. The further operation may be carried out as indicated in Example I.

Having now described our invention, what we claim is:

1. As new products, alkali metal salts of the 3.3¹-diamino-4.4¹-dioxyarsenobenzene combined with copper bound in a complex form, being dark powders dissolving in water with alkaline reaction, insoluble in alcohol and ether, and which change in the air and thereby become insoluble in water.

2. As a new product, the sodium salt of the 3.3¹-diamino-4.4¹-dioxyarsenobenzene combined with copper bound in a complex form, being a dark powder, dissolving in water with alkaline reaction, insoluble in alcohol and ether and which changes in the air and thereby becomes insoluble in water.

3. The process, which consists in treating with alkali the compounds obtainable by combining 3.3¹-diamino-4.4¹-dioxyarsenobenzene with copper-salts.

4. The process, which consists in treating with alkali the compound obtainable by combining 3.3¹-diamino-4.4¹-dioxyarsenobenzene with copper chlorid.

In testimony whereof, we affix our signatures in presence of two witnesses.

PAUL EHRLICH.
PAUL KARRER.

Witnesses:
JEAN GRUND,
CARL GRUND.